US011408645B2

(12) United States Patent
Warren et al.

(10) Patent No.: US 11,408,645 B2
(45) Date of Patent: Aug. 9, 2022

(54) HYBRID THERMOSIPHON SYSTEM

(71) Applicant: Alaska Native Tribal Health Consortium, Anchorage, AK (US)

(72) Inventors: John A. Warren, Anchorage, AK (US); William Fraser, Anchorage, AK (US); Bailey Gamble, Anchorage, AK (US)

(73) Assignee: Alaska Native Tribal Health Consortium, Anchorage, AK (US)

( * ) Notice: Subject to any disclaimer, the term of this patent is extended or adjusted under 35 U.S.C. 154(b) by 295 days.

(21) Appl. No.: 16/553,031

(22) Filed: Aug. 27, 2019

(65) Prior Publication Data
US 2020/0064028 A1 Feb. 27, 2020

Related U.S. Application Data

(60) Provisional application No. 62/723,400, filed on Aug. 27, 2018.

(51) Int. Cl.
| | |
|---|---|
| *F24T 10/10* | (2018.01) |
| *F28D 15/02* | (2006.01) |
| *F24S 10/95* | (2018.01) |
| *F24S 90/10* | (2018.01) |
| *F24T 10/00* | (2018.01) |

(52) U.S. Cl.
CPC .............. *F24T 10/10* (2018.05); *F24S 10/95* (2018.05); *F24S 90/10* (2018.05); *F28D 15/0266* (2013.01); *F24T 2010/53* (2018.05)

(58) Field of Classification Search
CPC ....... F24T 10/10; F24T 2010/53; F24T 50/00; F28D 15/0266; F28D 1/0226; F24S 10/95; F24S 90/10
See application file for complete search history.

(56) References Cited

U.S. PATENT DOCUMENTS

| | | | |
|---|---|---|---|
| 3,217,791 | A | 11/1965 | Long |
| 4,586,561 | A | 5/1986 | Franco et al. |
| 4,884,628 | A | 12/1989 | En-Jian et al. |
| | | (Continued) | |

FOREIGN PATENT DOCUMENTS

| | | |
|---|---|---|
| JP | 97224449 A | 8/1995 |
| JP | H07224449 A * | 8/1995 |
| | (Continued) | |

OTHER PUBLICATIONS

International Search Report and Written Opinion for International Application No. PCT/US2019/048382, dated Nov. 14, 2019, 9 pages.

(Continued)

*Primary Examiner* — Harry E Arant
(74) *Attorney, Agent, or Firm* — Stoel Rives LLP

(57) ABSTRACT

The disclosure relates to a thermosiphon system operable to consistently maintain the permafrost and active frost layer in a frozen condition to adequately support buildings and other structures. During cooler seasons, the thermosiphon system uses a passive refrigeration cycle to efficiently maintain the frozen layers using the cold air. When the air temperature rises during the warmer months, the system transitions into an active refrigeration mode that uses a refrigeration system to minimize thawing or degradation of the permafrost and active frost layers.

15 Claims, 3 Drawing Sheets

(56) References Cited

U.S. PATENT DOCUMENTS

| | | | |
|---|---|---|---|
| 4,961,463 A | | 10/1990 | Denhartog et al. |
| 5,190,098 A | | 3/1993 | Long |
| 5,238,053 A | | 8/1993 | Long |
| 5,327,734 A | * | 7/1994 | Haynes .................. E02D 27/35 |
| | | | 62/260 |
| 5,339,893 A | | 8/1994 | Haynes et al. |
| 9,271,429 B2 | | 2/2016 | Mashiko et al. |
| 2011/0070100 A1 | * | 3/2011 | McSweeney ........... F04B 35/04 |
| | | | 417/53 |
| 2012/0111027 A1 | * | 5/2012 | Campbell ............... F25B 40/00 |
| | | | 62/3.3 |
| 2015/0233617 A1 | * | 8/2015 | Chou ....................... F25B 49/02 |
| | | | 62/190 |
| 2016/0223270 A1 | | 8/2016 | Yang et al. |
| 2017/0030621 A1 | * | 2/2017 | Hung ....................... F25B 13/00 |
| 2017/0038084 A1 | | 2/2017 | Edwards et al. |
| 2017/0144548 A1 | * | 5/2017 | Ferguson ............. B60H 1/3211 |

FOREIGN PATENT DOCUMENTS

| | | |
|---|---|---|
| RU | 2548707 C1 | 4/2015 |
| RU | 2556591 C1 | 7/2015 |
| RU | 2655857 C1 | 5/2018 |
| WO | 9318356 A1 | 9/1993 |

OTHER PUBLICATIONS

Wagner, "Review of Thermosyphon Applications", ERDC/CRREL, Feb. 11, 2014, 46 pages.

European Patent Office, Extended European Search Report for Application 19854286.2, dated Mar. 30, 2022, 6 pages.

* cited by examiner

HYBRID THERMOSIPHON SYSTEM

RELATED APPLICATION

This application is a nonprovisional of and claims the benefit under 35 U.S.C. § 119(e) of U.S. Provisional Patent Application No. 62/723,400, filed Aug. 27, 2018, the disclosure of which is incorporated by reference herein in its entirety.

TECHNICAL FIELD

The field of the present disclosure relates generally to thermosiphon systems, and in particular, to such systems designed to maintain the stability and integrity of permafrost soils underneath structures.

BACKGROUND

In some environments, seasonal cooling and warming cycles may have a significant impact on the stability and integrity of structures, such as buildings, roads, and storage tanks, especially when such structures are built above permafrost soil layers. In such environments, maintaining the permafrost layer at or below freezing becomes a significant concern and is vitally important to maintaining the infrastructure in a stable state. One method for maintaining the integrity permafrost soils is to employ passive or active cooling systems. Generally speaking, passive cooling systems rely on temperature difference between the air and soil to function. Such systems function without external power and only operate when air temperatures are below freezing and lower than the ground temperatures. However, during extreme variations in weather, such systems may not be able to provide sufficient capacity for ground cooling applications. In contrast, an active cooling system allows for control of the cooling cycles and yields more predictable results, but typically requires external power for operation that may not be abundantly available or easily accessible in certain environments.

Accordingly, the present inventor has determined that it would be desirable to develop a hybrid thermosiphon cooling system that combines the advantages of both passive and active cooling for improved overall performance. Briefly, the improved system would continue to cool passively when air temperatures are sufficiently low, then provide powered active cooling as needed when air temperatures rise above the passive cooling threshold. Additional aspects and advantages will be apparent from the following detailed description of example embodiments, which proceeds with reference to the accompanying drawings. It should be understood that the drawings depict only certain example embodiments and are not to be considered as limiting in nature.

DETAILED DESCRIPTION OF EXAMPLE EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Figure 1:
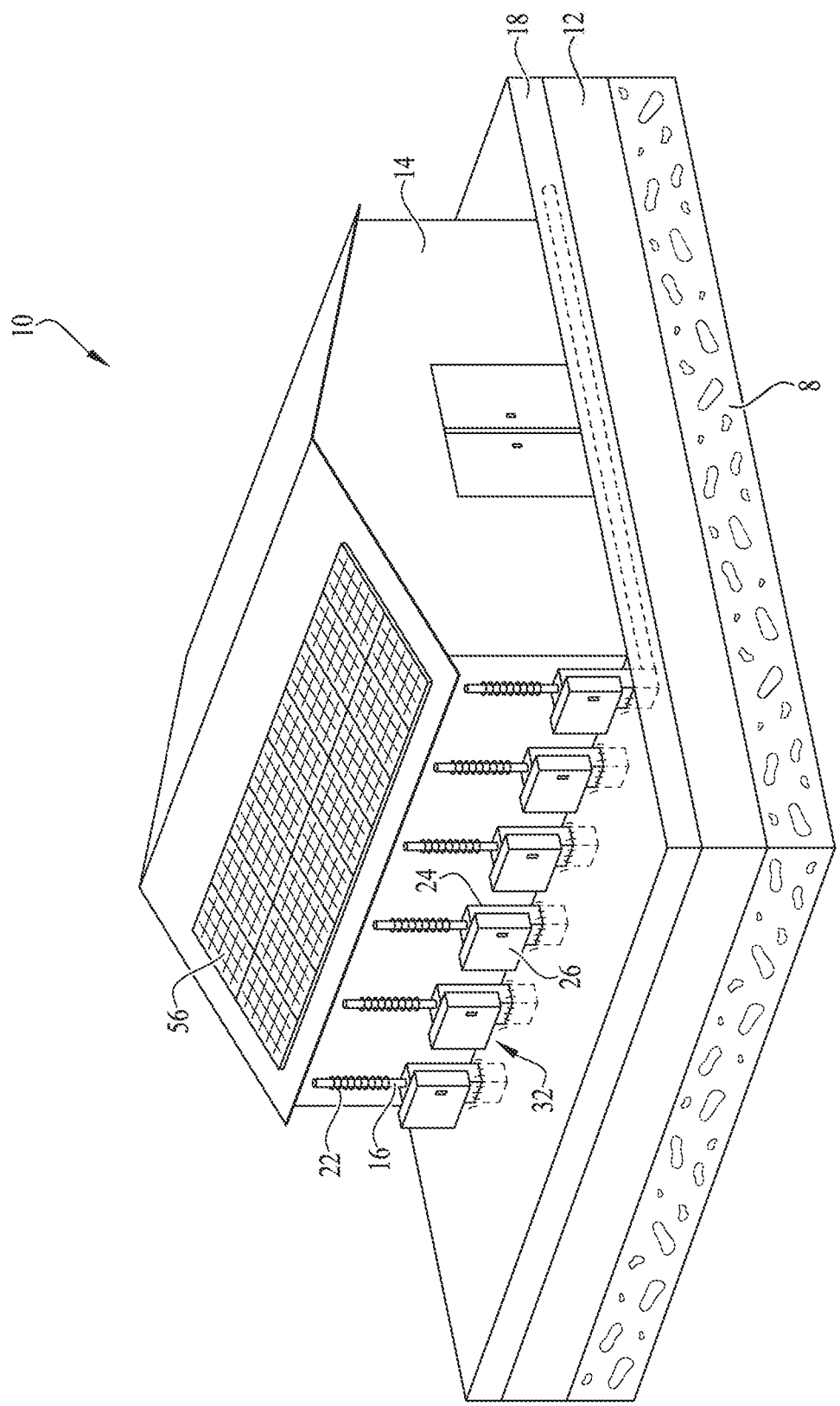
FIG. 1 is a schematic illustration of a hybrid thermosiphon system in accordance with one embodiment.
Figure 2:
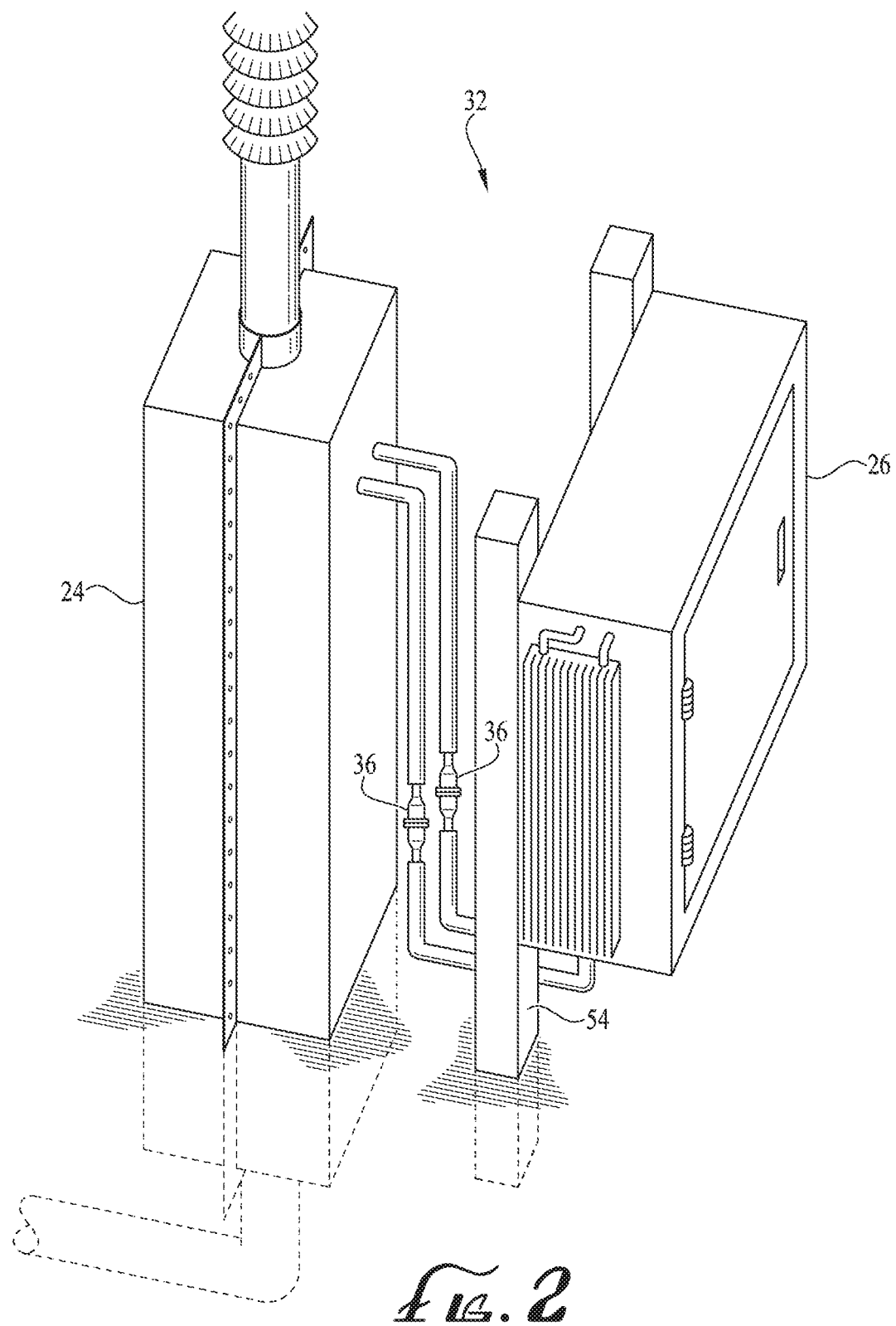
FIGS. 2 and 3 collectively illustrate details of an active cooling system of the hybrid thermosiphon system of FIG. 1.
Figure 3:
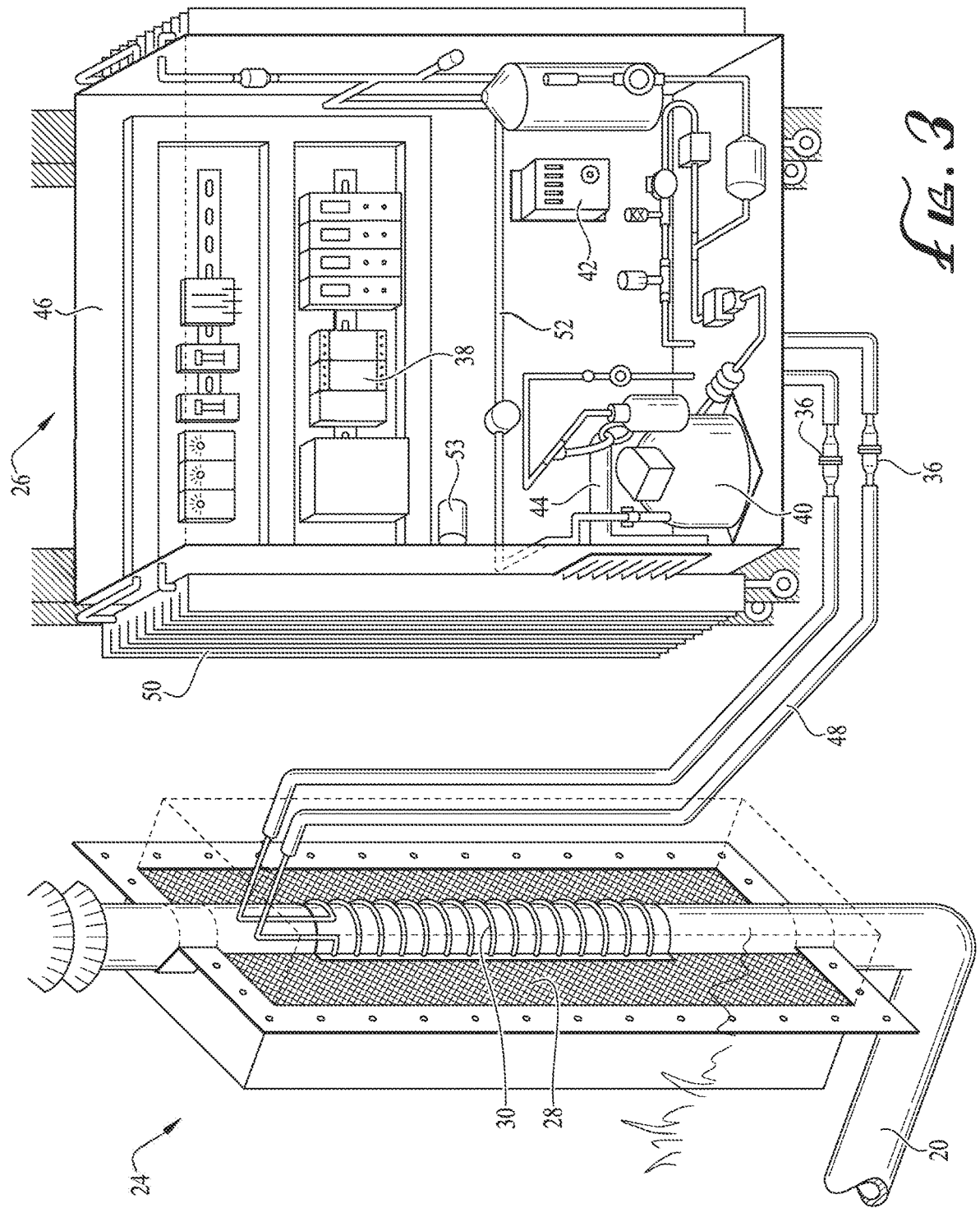

With general reference to FIGS. 1-3, the following disclosure relates generally to an improved hybrid thermosiphon system 10 designed to maintain permafrost levels underneath buildings or structures 14 with minimal energy consumption. As further described in detail below, the disclosed thermosiphon system 10 may increase the stability of permafrost layers by consistently maintaining the frozen soil levels in such a manner so as to minimize the impact of seasonal cooling and heating. For example, during the cooler seasons when the air temperature is below freezing, the thermosiphon system 10 is able to efficiently maintain the permafrost layer by using the cold air temperature to provide sufficient cooling. When the air temperature rises above freezing during the warmer months, the thermosiphon system 10 provides additional cooling via an active refrigeration system 26 to minimize thawing or degradation of the permafrost layer. As further discussed in detail below, the thermosiphon system 10 strives to continuously maintain the permafrost layer at a consistent level (e.g., by minimizing thawing) despite seasonal temperate changes to avoid the need to refreeze regions of the permafrost that may have thawed, thereby reducing overall power consumption during the warmer months. Additional details and advantages of the thermosiphon system 10 are discussed below with reference to FIGS. 1-3.

FIG. 1 schematically illustrates various components of a thermosiphon system 10 designed to maintain the active frost layer 12 in a frozen state to avoid potential degradation and destabilization of the foundation underneath a structure or building 14. As illustrated in FIG. 1, in certain environments, the structure 14 may be built upon rock or soil that includes a permafrost layer 8 and an active frost layer 12. The permafrost layer 8 consists of rock and/or soil that remains at or below the freezing point of water such that the layer remains frozen. The active frost layer 12, on the other hand, includes rock and/or soil that freezes and thaws annually due to seasonal and climate changes. Accordingly, when constructing structures in such environments, the building design and foundation must account for the repeated freezing and thawing cycles of the ground to avoid potential structural integrity issues, which may eventually lead to the structure 14 being unsafe or uninhabitable. The following description provides a brief overview of the components of the hybrid thermosiphon system 10 and their interaction with reference to FIG. 1, followed by a more detailed discussion relating to the structure and function of the active cooling system 32.

With reference to FIG. 1, the thermosiphon system 10 includes a plurality of thermosiphon evaporator pipes 16 each installed into the ground surface layer 18. The evaporator pipes 16 are arranged generally vertically relative to the ground surface layer 18 and include a lower pipe tail section 20 that extends below the surface layer 18 and into or through the active frost layer 12. Each evaporator pipe 16 is enclosed and houses a refrigerant or cooling fluid (e.g., a gas or liquid) that runs through to the lower pipe tail section 20. During the cold months when the surrounding air temperature is lower than the ground temperature, the thermosiphon system 10 relies on the cold environmental air to cool the refrigerant in the evaporator pipes 16, which in turn extracts heat from the active frost layer 12 via an evaporation process. In an example operation, the refrigerant removes heat from the active frost layer 12 through the lower pipe tail section 20, the vapors of which move upwardly through the evaporator pipe 16 toward a thermosiphon condenser 22. Condensation occurs at the condenser 22, causing the refrigerant to flow downwardly against the walls of the evaporator pipes 16 to continue the refrigeration cycle where the refrigerant continues drawing heat from the soil to maintain the active frost layer 12 in a frozen state. This refrigeration cycle continues to operate in a passive state as long as the air temperature above the ground surface layer 18 is cooler than the temperature of the active permafrost layer 12.

During the warmer summer months when the air temperature is higher than the temperature under the soil, the thermosiphon condenser 22 can no longer operate passively as described above. In such instances, a supplementary form of refrigeration is required to condense the refrigerant in the vertical portion of the thermosiphon evaporator pipe 16 below the condenser 22 to maintain the active frost layer 12 (and to some extent, the permafrost layer 8) in a frozen condition. For such conditions, the hybrid thermosiphon system 10 further includes a powered active cooling system 32. Additional details of the active cooling system 32 and its components is described in further detail below with collective reference to FIGS. 2-3.

FIGS. 2 and 3 collectively illustrate details of the active cooling system 32 and its components. With collective reference to FIGS. 2 and 3, the active cooling system 32 includes an insulated evaporator system 24 and a refrigeration system 26 coupled to one another. The following section begins with a description of the insulated evaporator system 24 and its components, followed by a discussion of the refrigeration system 26 and its components and a discussion relating to the interaction of the two systems 24, 26.

With collective reference to FIGS. 2 and 3, the insulated evaporator system 24 includes a durable insulated shell 28 that surrounds the evaporator (or heat exchanger) portion 30 of the active cooling system 32. In some embodiments, the shell 28 may include two separate shell portions that are removably coupled to one another to enclose the evaporator 30. The shell portions may be coupled in any one of various suitable methods. As illustrated in FIGS. 2 and 3, the evaporator 30 and the shell 28 are installed onto the thermosiphon evaporator pipe 16 below a position of the thermosiphon condenser 22 without need for modification of the thermosiphon or other existing components. As illustrated in FIG. 1, a lower portion of the shell 28 is buried into the ground surface layer 18.

Returning to FIG. 3, the refrigeration system 26 includes a durable, weatherproof enclosure 46 housing the electrical and mechanical components of the active refrigeration system. With reference to FIG. 3, the refrigeration system 26 houses a cooling fluid, such as a mixture of liquid and gas phase refrigerant, which is delivered to the evaporator 30 via the conduits 48 (e.g., flexible piping) at a sufficiently low temperature to cause condensation inside the thermosiphon condenser 22, thereby allowing the thermosiphon system to continue operating in a similar fashion as the passive state described above. Briefly, heat from the thermosiphon is transferred to the evaporator 30, evaporating the refrigerant, which then is returned to the refrigeration system 26 via the conduits 48. The refrigeration system 26 condenses the refrigerant and releases the heat to the atmosphere through condensers 50 which are coupled to the refrigeration system enclosure 48 before returning low temperature refrigerant back to the evaporator 30 to continue the refrigeration cycle.

With particular reference to FIG. 2, the refrigeration system 26 may be coupled to vertical supports 54 adjacent the evaporator system 24. In other embodiments, the refrigeration system 26 may be coupled directly to the evaporator system 24 along the shell 28. Preferably, the conduits 48 include self-sealing quick disconnect fittings 36 to connect the evaporator system 24 and refrigeration system 26. The fittings 36 provide a number of advantages for the thermosiphon system 10. For example, the fittings 36 allow the systems 24, 26 to be easily separated from one another without the need to remove the cooling fluid. This design also simplifies transportation of the systems 24, 26 to and from the often remote locations in which the thermosiphon system 10 is installed. In addition, the fittings 36 simplify and reduce the cost of installation by eliminating the need for a licensed refrigerant technician on-site since units can be charged with refrigerant in an urban center prior to transport. Moreover, the fittings 36 facilitate repair/maintenance work that may be needed for the systems 24, 26 without requiring an on-site technician since the systems 24, 26 may be transported individually as needed.

Returning to FIG. 3, the refrigeration system 26 preferably includes a heater 42, a cooling unit 44 (such as a combination cooling coil and fan), a compressor head pressure control 53, and a hot gas bypass control 52 to facilitate reliable operation under a wide range of heat loads and environmental conditions. These components may be controlled by a process controller 38 and operated to maximize efficiency of the overall system.

In some embodiments, the thermosiphon system 10 may further include temperature and/or pressure sensors (not shown) operable to determine the temperature of the thermosiphon and the operating conditions within the refrigeration system 26. When specific temperature and pressure parameters are met, the respective sensor(s) may send a signal to the process controller 38. Upon receiving the signal, the compressor 40 may be activated and begin cooling to continue the refrigeration cycle and maintain the active frost layer 12 in a frozen state. In some embodiments, the process controller 38 may be programmed to vary the speed of the compressor 40 to further stabilize system operating conditions as needed.

In some embodiments, the system 10 may further include a variety of solar panels 56 used to power the refrigeration system 26. For example, with reference to FIG. 1, the structure 14 may include an array of solar panels 56 arranged to generate electricity throughout the year, primarily during the warmer summer months and shoulder seasons. Accordingly, during operation, the power generated by the solar panels 56 may be used to offset the power consumption of the active cooling system 32. In other embodiments, the active cooling system 32 may operate via a conventional power source, such as batteries or fuel, by a combination of solar energy and a conventional power source, or any other suitable power sources.

With reference to FIG. 1, it should be understood that the size of the active cooling system 32 components determines the rate of cooling and heat extraction within the evaporator pipes 16. Preferably, the active cooling system 32 has sufficient capacity so as to maintain the active frost layer 12 sufficiently cooled to avoid thawing cycles. As illustrated in FIG. 1, the system 10 may include a plurality of active cooling systems 32 operable to service a number of thermosiphon evaporator pipes 16. For example, in some embodiments, each evaporator pipe 16 may include an active cooling system 32. It should be understood that in other embodiments, any suitable number of active refrigeration systems 32 may be used as needed.

It should be understood that many of the features, components, and processes described herein are for illustration purposes. Accordingly, one having ordinary skill in the art may rearrange the features and process steps described herein in any of the embodiments without departing from the principles of the disclosure. In addition, it is intended that subject matter disclosed in portion herein can be combined with the subject matter of one or more of other portions herein as long as such combinations are not mutually exclusive or inoperable. In addition, many variations, enhancements and modifications of the concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A hybrid thermosiphon system comprising:
    a thermosiphon pipe mountable along a ground surface, the pipe including a tail section extending below the ground surface and into an active frost layer when the pipe is mounted;
    a condenser in fluid communication with the thermosiphon pipe;
    an evaporator coupled to the pipe and positioned between the condenser and the ground surface;
    a shell including separate shell sections removably coupled to one another, each shell section having an insulating layer housed within an interior compartment thereof, the shell enclosing the evaporator, wherein the evaporator and the shell are removably installable onto and around an exterior surface of the thermosiphon pipe without modification of the thermosiphon pipe; and
    a refrigeration system in fluid communication with the evaporator, the refrigeration system operable to cool and deliver a refrigerant to the evaporator,
    wherein when an ambient air temperature is less than a threshold temperature, the thermosiphon pipe, condenser, evaporator, and refrigerant cooperate to cool the active frost layer and maintain a frozen state thereof without the refrigeration system cooling the refrigerant, and wherein when the ambient air temperature exceeds the threshold temperature, the refrigeration system cools the refrigerant prior to delivery to the evaporator.

2. The hybrid thermosiphon system of claim 1, wherein a portion of the shell is positioned beneath the ground surface.

3. The hybrid thermosiphon system of claim 1, wherein the refrigeration system is in fluid communication with the evaporator via a conduit, and wherein the refrigerant is delivered to the evaporator via the conduit.

4. The hybrid thermosiphon system of claim 3, wherein the conduit further includes releasable fittings operable to selectably couple and decouple the refrigeration system and evaporator.

5. The hybrid thermosiphon system of claim 1, further comprising a sensor system operable to measure one or both of a temperature and a pressure parameter, the sensor system in communication with a controller of the refrigeration system, wherein the sensor system is operable to send an activation signal to the controller when one or both of the measured temperature and pressure parameters satisfy a threshold parameter.

6. The hybrid thermosiphon system of claim 5, the refrigeration system further including a compressor in communication with the controller, wherein the controller activates the compressor in response to receiving the activation signal.

7. The hybrid thermosiphon system of claim 6, wherein the controller is further operable to vary an operating speed of the compressor.

8. The hybrid thermosiphon system of claim 1, further comprising a solar power array in operable communication with the refrigeration system, the solar power array operable to power the refrigeration system.

9. The hybrid thermosiphon system of claim 1, further comprising a sensor system operable to measure one or both of a temperature and a pressure parameter, the hybrid thermosiphon system further comprising a controller programmable to selectively operate the refrigeration system, wherein the controller selectively operates the refrigeration system based on one or both of the measured temperature and pressure parameters.

10. The hybrid thermosiphon system of claim 1, further comprising a temperature control unit operable to control a temperature within the refrigeration system.

11. The hybrid thermosiphon system of claim 10, the temperature control unit including a cooling unit operable to decrease the temperature within the refrigeration system and a heating unit operable to increase the temperature within the refrigeration system.

12. The hybrid thermosiphon system of claim 1, further comprising head pressure and hot-gas bypass controls to permit operation of the refrigeration system at low ambient temperatures.

13. The hybrid thermosiphon system of claim 1, wherein the evaporator includes a plurality of coils mounted onto and contacting an exterior surface of the thermosiphon pipe, wherein the refrigerant from the refrigeration system flows through the plurality of coils along the exterior surface of the thermosiphon pipe.

14. The hybrid thermosiphon system of claim 1, wherein the refrigeration system is mounted directly onto and supported by the shell.

15. The hybrid thermosiphon system of claim 14, wherein the refrigeration system is mounted onto one of the separate shell sections of the shell.

* * * * *